United States Patent

[11] 3,609,536

| [72] | Inventors | Richard A. Danofsky;<br>Richard A. Hendrickson, both of Ames, Iowa |
|---|---|---|
| [21] | Appl. No. | 690,532 |
| [22] | Filed | Dec. 14, 1967 |
| [45] | Patented | Sept. 28, 1971 |
| [73] | Assignee | Iowa State University Research Foundation<br>Ames, Iowa |

[54] TESTING APPARATUS FOR COUNT RATE CIRCUITS USING PULSES
7 Claims, 4 Drawing Figs.

[52] U.S. Cl. .................................................. 324/57,
307/271, 331/44
[51] Int. Cl. ....................................................... G01r 27/00
[50] Field of Search ........................................... 324/57 PI,
57 FP, 57 O, 57 NBC, 57 D, 57 MI, 118, 78, 77 E,
57 SI, 120, 78 I; 328/13, 27, 29; 340/146.1 E, 149;
235/153, 181, 192; 73/1 A; 330/2; 331/44, 179;
307/261, 235, 271, 301

[56] References Cited
UNITED STATES PATENTS

| 3,013,159 | 12/1961 | De Sautels................. | 307/235 |
| 2,471,530 | 5/1949 | Lobel........................... | 324/57 X |
| 2,990,516 | 6/1961 | Johannessen................ | 307/261 X |
| 3,102,231 | 8/1963 | Wolf............................. | 324/57 |
| 3,381,218 | 4/1968 | Taylor......................... | 324/57 |

*Primary Examiner*—Edward E. Kubasiewicz
*Attorney*—Dawson, Tilton, Fallon & Lungmus ABSTRACT: The output signal of a variable frequency sine wave generator is superimposed on a DC level to generate a unipolar signal with sinusoidally varying amplitude. This signal drives a voltage-to-frequency converter which generates a train of pulses of constant amplitude and width, and has a repetition rate proportional to the instantaneous amplitude of the sine wave signal. The output signal of the voltage-to-frequency converter is fed to the input terminals of a count rate circuit under test. The accuracy with which the output signal of the count rate circuit reproduces the original sine wave signal is a measure of the frequency response of the count rate circuit.

Inventors:
Richard H. Danofsky
Richard H. Hendrickson
By: Dawson, Tilton, Fallon & Lungmus
Attys.

TESTING APPARATUS FOR COUNT RATE CIRCUITS USING PULSES

BACKGROUND

The present invention relates to count rate circuits; more particularly, it relates to apparatus for determining the frequency response of count rate circuits.

A nuclear reactor, which under certain conditions is a linear physical system, can be expected to exhibit noise (that is, the random generation of neutrons) in a variety of ways. In most cases, reactor noise is due to the random nature of its neutron population. For example, when the neutron population is relatively low, the reactor power level can be expected to fluctuate at random because the effects of individual neutrons are observed. However, when the neutron density is high the random fluctuation in the power level are more likely caused by other disturbances, such as the temperature of the fuel or the coolant flow rate.

Noise analysis has become an important analytical tool used by many scientist and engineers in obtaining information concerning reactor dynamics. A simple analysis of the random fluctuations is the power level of a nuclear reactor may provide a continuous report on operating variables of the reactor; and, hence, they are of great assistance to the operator.

The reactor signal to which the noise is referred may simply be the average neutron density or power level of the reactor, or it may be certain variation of the reactor power produced by positioning a control rod. In most cases, power level is controlled by means of a control rod. The transfer function of the system may be obtained at discrete frequencies by oscillating a control rod at each frequency. In some measurements of the reactor transfer function, a control rod is moved randomly to cause a broad continuous frequency range at one time.

Neutron density or power level is normally measured in one of two ways. In one method, an ionization chamber is exposed to the neutron flux, and a micro-microammeter measures the amount of ionization in the chamber which is a function of the instantaneous neutron level within the reactor. A second method uses a pulse-type detector, such as a boron-trifluoride tube which generates an output pulse for every detected neutron. The pulses from the pulse type of detector may be stored in a digital counter of scaler in which case the count per unit time is representative of the rate of neutron generation. Alternatively, a count rate circuit may be used to generate an analog signal representative of the instantaneous count rate.

A conventional count rate meter (as distinguished from a count rate circuit) includes at least two stages of amplification receiving the output from the radiation detector and generating electrical pulses of sufficient amplitude for detection. The output of the amplifiers is fed through a discriminator which accepts pulses above a predetermined amplitude only, and then it is fed into a pulse shaper which generates a pulse of constant amplitude and width for each incident pulse transmitted through the discriminator. The output of the pulse shaper circuit energizes a count rate circuit which generates and analog output signal representative of the time average of incident input pulses. In other words, the output of the count rate circuit is a direct measurement of the neutron level within the reactor. The output of the count rate circuit may be recorded permanently of displayed on an oscilloscope.

Reactor noise measurements are also measured with count rate circuits. With the increased demand to obtain more accurate measurements of neutron level within a reactor for the purpose of studying its noise characteristics, attempts have been made to obtain more and more accurate count rate meters. Of all of the various circuits in a count rate meter of the pulse-detection type, the count rate circuit is the most likely to introduce error into measurements. Hence, it becomes highly desirable not only to have a convenient method of checking count rate circuits, but also of determining the frequency response of individual count rate circuits so that suitable corrections and compensations can be made to the observed noise data.

Prior attempts to facilitate checking the accuracy of individual count rate circuits have included theoretical circuit analysis based upon given values of circuit parameters. However, this method is not very useful, since a conventional count rate circuit by its very nature is nonlinear in operation. It is not possible to obtain the frequency response of the count rate circuit by feeding a continuous sine wave into the input as is done with linear systems because of the nonlinear characteristics of the circuit. Further, a count rate circuit does not ordinarily receive a continuous sine wave signal at its input as has already been explained, but rather it receives a pulse train.

SUMMARY

The present invention contemplates a simplified apparatus for testing the accuracy of count rate circuits. The output signal of a variable-frequency sine wave generator is superimposed on a DC level to generate a signal of homogeneous polarity with sinusoidally varying amplitude. This signal device drives a voltage-to-frequency converter which generates a pulse signal of constant amplitude and width and has a repetition rate proportional to the instantaneous amplitude of the sine wave signal. Hence, the output signal of the voltage-to-frequency converter is a train of pulses wherein all the pulses have constant amplitude an width and wherein the repetition rate of the train varies sinusoidally.

The output signal of the voltage-to-frequency converter is then fed to the input terminals of a count rate circuit under test. The accuracy with which the output signal of the count rate circuit reproduces the original sine wave signal is a measure of the frequency response of the count rate circuit, and hence, its accuracy. Further by superimposing the output signal of the count rate circuit upon the original sine wave signal, there is automatically obtained the output-voltage vs. input-frequency response characteristic of the count rate circuit.

Other features and advantages of the present invention will be apparent to persons skilled in the art from the following detailed description of a preferred embodiment accompanied by the attached drawing.

THE DRAWING

CONVENTIONAL COUNT RATE CIRCUIT

Figure 1:
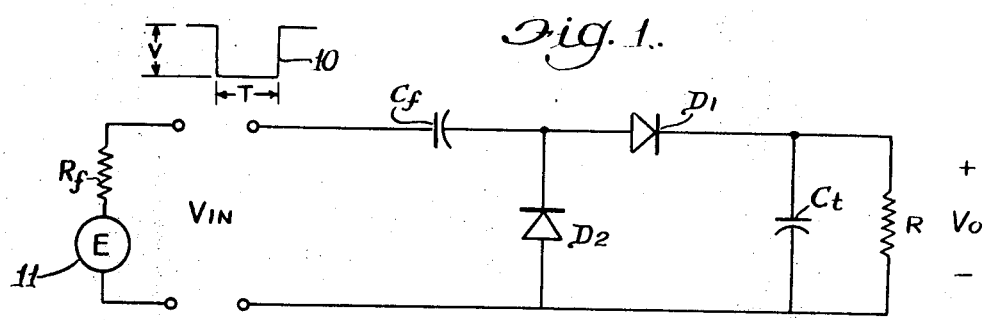
FIG. 1 is a circuit schematic diagram of a conventional count rate circuit.

Referring to FIG. 1, a conventional count rate circuit includes a diode pump circuit that feeds a constant amount of charge for each input pulse into a tank capacitor, $C_t$ in FIG. 1 which is shunted by a load resistor R. The output voltage $V_o$ is developed across resistor R, and under proper operating conditions, it bears a linear relationship with the repetition rate of input pulses, one of which is schematically illustrated by reference numeral 10 in FIG. 1.

The diode pump circuit comprises an input capacitor $C_f$ and a diode $D_1$ connecting the capacitor $C_f$ to the tank circuit with the cathode of diode $D_1$ connected to the tank circuit. A second diode $D_2$ connects the junction of the capacitor $C_f$ and the anode of diode $D_1$ to the other input terminal with the anode of diode $D_1$ to the other input terminal with anode of diode $D_2$ connected to the other input terminal of the circuit. The source of the input pulses (which for the diode configuration shown are negative pulses) is schematically represented by a source 11 in series with a resistor $R_f$.

The voltage across the tank capacitor $C_t$ builds up to an equilibrium value at which the rate of loss of charge through the shunt resistor R equals the rate of addition of charge by the input pulses. If the charge per pulse is constant, the equilibrium of the voltage $V_o$ is as follows:

$$V_o = r q R, \quad (1)$$

where, $r$ is the average number of pulses per second,
$R$
$q$ is the charge per input pulse into $C_t$, and
$R$ is the value of the shunt resistor.

This, of course, assume that the input voltage pulses have constant amplitude and constant width; and that the pulse width is sufficient to allow the input capacitor $C_f$ to completely charge during each pulse, as is presently explained.

As mentioned, charge is transmitted to the integrating or tank capacitor $C_t$ by means of the diode pump circuit. For a rectangular pulse of duration T and amplitude $V$ by means of a generator 11 with internal resistance $R_f$, as in FIG. 1, the capacitor $C_f$ is charged (through the resistor $R_f$ in series with the diode $D_2$) approximately to the value of the input pulse voltage $V$, provided that the pulse duration T is greater than about five times the charging time constant (that is, 5 $R_f C_f$). When the input pulse returns to zero, $C_f$ discharges through diode $D_1$ placing a fixed charge of $VC_f$ per pulse of the tank capacitor $C_t$ provided that the following conditions hold:

$C_f$ is very much less than $C_t$,
$V_o$ is very much less than $V$, and
$(1/r)-T$ is greater than 5 $R_f C_f$ The first two conditions insure that negligible charge remains on $C_f$ in equilibrium, while the third condition insures that sufficient time elapses for equilibrium to be nearly reached before the next input pulse occurs. If the second condition is not satisfied, the charge per pulse becomes $(V-v_0)v) C_f$ and the output equation becomes $$V_o = \frac{V r C_t R}{1 + r C_t R}$$

This equation indicates that a nonlinear relationship between output voltage and input counting rate may result from improper choice of the circuit parameters.

DETAILED DESCRIPTION OF PREFERRED EMBODIMENT

Figure 2:
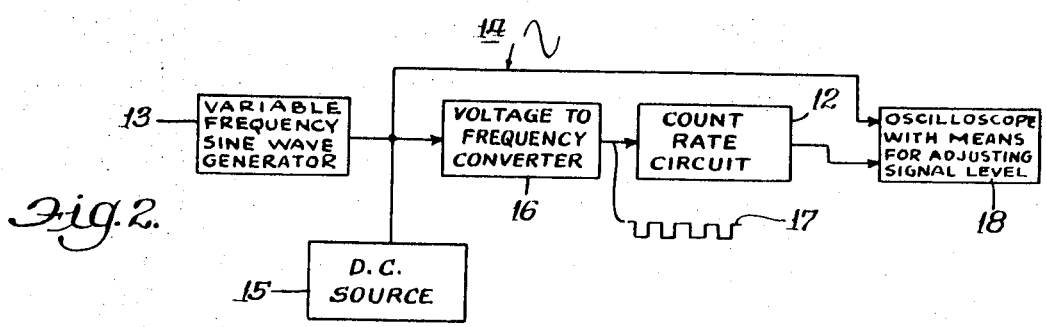
FIG. 2 is a block schematic diagram of a system according to the present invention.

Referring now to FIG. 2, there is seen a block schematic diagram of a preferred apparatus for testing a count rate circuit which is schematically designated by reference numeral 12. A conventional sine wave generator 13 generates an output voltage having an amplitude which varies sinusoidally with time; and this waveform is designated 14 in FIG. 2. A source of DC voltage 15 is coupled to the output of the sine wave generator 13 so that the output voltage of the sine wave generator 13 is superimposed upon the constant voltage generated by the DC source 15.

A voltage-to-frequency converter 16 received the combined outputs of the sine wave generator 13 and the DC source 15, and generates a train of rectangular output pulses (schematically illustrated by reference numeral 17) having a repetition rate proportional to the instantaneous amplitude of its input signal. The output of the voltage-to-frequency converter 16 feeds the count rate circuit 12. The output signal of the count rate circuit 12 and the sine wave generator 13 are then fed to the oscilloscope 18 for comparison.

VOLTAGE-TO-FREQUENCY CONVERTER

Figure 4:
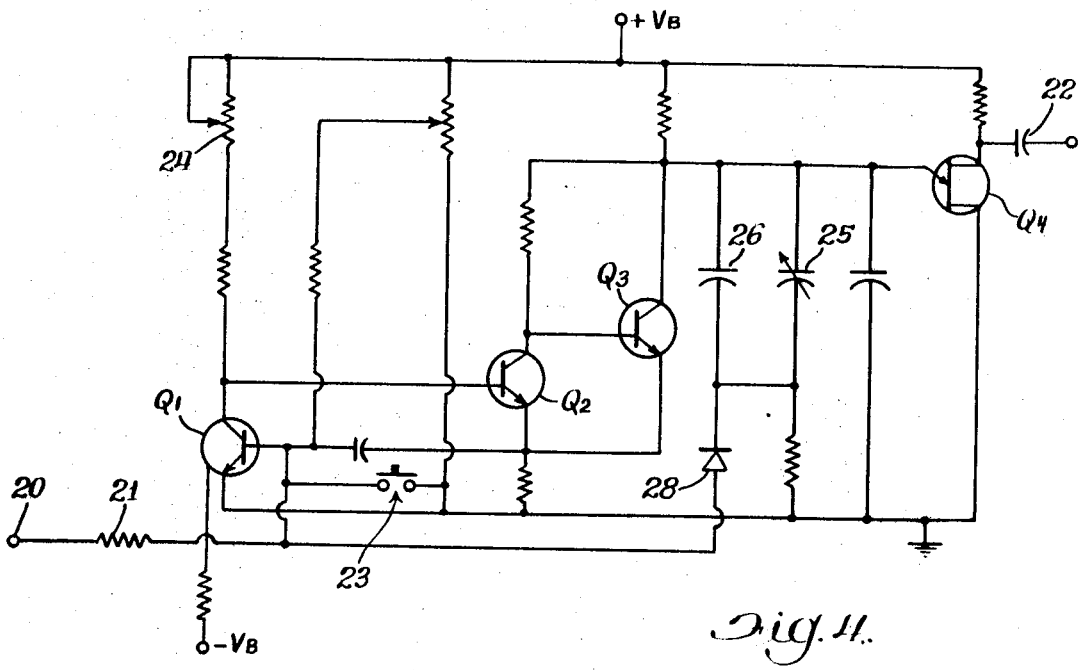
FIG. 4 is a circuit schematic diagram of a voltage to frequency converter.

The voltage-to-frequency converter 16 is an electronic circuit which, as has already been mentioned, generates a train of output pulses having a repetition rate proportional to the amplitude of its input voltage. The circuit configuration for one voltage-to-frequency converter that was actually used is shown in FIg. 4. The voltage-to-frequency is designed so that an input amplitude of 1 volt produces a frequency of 1,000 Hz. Other circuit configurations and frequencies may obviously be used with like results.

The input signal is received at an input terminal 20 and coupled to the base terminal of a first transistor $Q_1$ through a resistor 21. The collector of $Q_1$ drives the base of a second transistor $Q_2$ the collector of which drives the base of a cascaded pair of transistors $Q_2$ and $Q_3$. The collector of $Q_3$ drives the input of the unijunction transistor $Q_4$. The output pulse is taken from the output terminal of the unijunction transistor $Q_4$ through a blocking capacitor 22 to eliminate DC coupling.

The cascaded transistors $Q_1$, $Q_2$, and $Q_3$ from a high-gain operational amplifier having an overall voltage gain of approximately 5,000. A high degree of linearity and stability is achieved by negative feedback throughout. The input impedance of the voltage-to-frequency converter is largely determined by the value of the resistor 21, which was chosen to be 100,000 ohms. Linearity of the circuit is better than 0.1 percent with a short-term equivalent input voltage drift of less than 0.5 millivolts.

Each time the unijunction transistor $Q_4$ conducts, a fixed quantity of charge is coupled back to the input of the amplifier through the diode-capacitor network including in parallel a variable capacitor 25 and a fixed capacitor 26, the combination being connected in series with a diode 28 which is connected to the base of transistor $Q_1$. The average current feedback is proportional to the input voltage to maintain the summing junction at the base of $Q_1$ at zero potential.

Operation of the circuit is initiated by closing a switch 23 which couples the base of the input transistor $Q_1$ to the positive power supply $+V_B$ thereby saturating transistor $Q_1$. With the switch 23 thus closed, a variable resistor 24 in the collector circuit of $Q_1$ is adjusted until oscillation commences. When switch 23 is opened, an external source of 1 millivolt is applied to the input, the variable capacitor 25 is adjusted to the point where the output frequency is 1,000 Hz. The voltage-to-frequency converter shown in FIG. 4 is then operational for generating a string of output pulses taken from the output terminal of unijunction transistor $Q_4$ having a repetition rate which is linearly related to the amplitude of its input voltage. The power supply used for biasing the transistors in the voltage-to-frequency converter should, of course, be at least as stable as the required measurement accuracy. Capacitor 22 blocks the DC component in the output voltage pulse train which is then fed directly to the count rate circuit 12 in FIG. 2.

With this arrangement, if a sine wave which is always positive is applied to the input terminal 20 of the voltage-to-frequency converter 16, the output pulse train has a repetition rate which increases and decreases accordingly, following a sinusoidal distribution. Thus, the output of the voltage-to-frequency converter simulates the actual pulses that a count rate circuit would encounter in a pulse detection system with a wide range in repetition rate. Thus, the count rate circuit may be tested for its frequency response for any time-varying signal generated by the voltage-to-frequency converter. Although the particular input voltage-to-frequency converter illustrated is energized by a sine wave, it will be obvious that other periodic waveforms may be used. Also, the average repetition rate may be varied by changing the DC bias at the input. This would correspond to different average radiation levels at the location of the detector.

OPERATION

In operation, the sinusoidal output voltage waveform from the sine wave generator is superimposed on a DC level generated by the source 15 in a manner such that the resulting waveform is a sine wave having a minimum value of about 2 volts positive. The amplitude of the sine wave may be varied if desired. However, it has been found that sufficient data may be obtained by using a constant amplitude waveform, and, hence, the same counting rate variation.

The desired positive waveform is fed into the voltage-to-frequency converter 16 which transforms the time-varying voltage into a train of identical pulses having a repetition rate which varies sinusoidally with time. The train of voltage pulses is then impressed across the input terminal of the count rate circuit under test. The output voltage from the count rate circuit 12 is displayed on the oscilloscope 18, and its waveform is described by equation 1.

Figure 3:
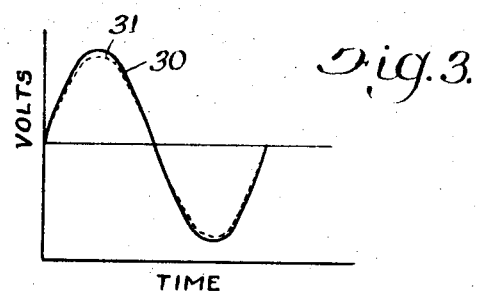
FIG. 3 illustrates the output of the count rate circuit superimposed upon the output of the sine wave generator of FIG. 2

The peak-to-peak amplitude of the output of the count rate circuit is, of course, reduced from that of the amplitude of a sine wave generator 13; however, when the output of the count rate circuit is displayed on one horizontal sweep circuit of a dual-beam oscilloscope with the output of the sine wave generator 13 displayed on the other horizontal sweep, the amplitude of the output signal from the one count rate circuit 12 may be suitably amplified so that two output voltages are superimposed as illustrated in FIG. 3. In FIG. 3, the solid sinusoidal line illustrates the output of the sine wave generator 13; and the dashed sinusoidal line 31 represents the output of the count rate circuit 12. In this particular illustration, the high frequency cutoff limit of the count rate circuit under test has been reached with the resultant decrease in the peak region of the reproduced sine wave.

The frequency response of the count rate circuit is obtained by varying the frequency of the sine wave from the generator 13 from 1 to 1,000 Hz. As the frequency of the input signal is increased, the output of the count rate circuit decreases according to the frequency response characteristic of the circuit.

Thus, with the present system, one can conveniently determine the frequency transfer characteristic of a given count rate circuit, or, alternately, test the count rate circuit at a given frequency, (for example, the cutoff frequency) to determine whether the count rate circuit output is within prescribed tolerances of the sine wave reference signal. In addition, a distortion analyzer might be used to study the count rate circuit output.

Having thus described in detail a preferred embodiment of my invention, it will be obvious to persons skilled in the art that certain equivalent circuit structures may be substituted for those which I have described, while continuing to practice the principles of the invention; it is, therefore, intended that all such substitutions and modifications be covered as they are embraced within the spirit and scope of the appended claims.

We claim:

1. Apparatus for testing the frequency response of a count rate circuit comprising: generator means for generating a periodic electrical signal having an amplitude varying with time; converter means receiving the output signal of said generator for generating a train of output pulses of constant amplitude and width having a repetition rate which is a function of the instantaneous amplitude of its input signal, said count rate circuit receiving the output signal of said converter means; whereby the output signal of said count rate circuit reproduces the output signal of said generator means when said count rate circuit is operating on a linear portion of its transfer characteristic.

2. The structure of claim 1 further comprising means for varying the period of said generator means, whereby the accuracy with which said count rate circuit reproduces said generator means output signal is a measure of the frequency response of said count rate circuit.

3. The system of claim 2 characterized by the fact that said generator means generates an output signal which varies sinusoidally with time.

4. The system of claim 3 further comprising comprising means receiving the signal of said count rate circuit and the output signal of said generator means for comparing them.

5. The system of claim 4 wherein said comparison means is a dual-beam oscilloscope.

6. The system of claim 3 wherein said converter means includes a unijunction transistor for generating an output pulse of constant amplitude and width and an operational amplifier for driving said unijunction transistor with capacitor feedback means from the input of said unijunction transistor to the input of said converter means whereby a constant charge is fed back to the input of said operational amplifier means each time said unijunction conducts.

7. The structure of claim 6 further comprising oscilloscope means for superposing the output signal of said sine wave generator on the output signal of count rate circuit, said oscilloscope means further including means for adjusting the level of the signal of said count rate circuit to be equal of the amplitude of said sine wave generator.